June 12, 1934.                W. ALBERSHEIM ET AL                1,963,011
                                 VISCOSITY METER
                              Filed March 31, 1928            2 Sheets-Sheet 1

INVENTORS
WALTER ALBERSHEIM
BY HARVEY KONHEIM
ATTORNEY

June 12, 1934.  W. ALBERSHEIM ET AL  1,963,011
VISCOSITY METER
Filed March 31, 1928  2 Sheets-Sheet 2

INVENTORS
WALTER ALBERSHEIM
BY HARVEY KONHEIM
ATTORNEY

Patented June 12, 1934

1,963,011

UNITED STATES PATENT OFFICE 1,963,011

VISCOSITY METER

Walter Albersheim and Harvey S. Konheim,
New York, N. Y.

Application March 31, 1928, Serial No. 266,271

5 Claims. (Cl. 265—11)

This invention relates to meters for measuring the viscosity of liquids and deals more specifically with a viscosity meter, which is direct reading, and which does not employ valves, governors, or the like for limiting the pressure or velocity of the fluid flowing.

Briefly, this result is realized by passing the liquid through two orifices of different characteristics, and automatically combining the pressure drops in the orifices, in such a way that the resultant movement in an indicating device is a known function of the viscosity alone, and independent of the initial pressure and speed of the fluid.

The present invention will be more readily understood from the following description taken in connection with the accompanying drawings, in which Figs. 1–3 are detail views showing different orifices.

The pressure drop due to non-turbulent flow of a liquid through any orifice results from two factors, viz:

1. The change of speed or direction of flow causes a pressure reaction which is proportional to the square of the velocity.

2. The viscous friction causes a drop, which is proportional to the product of the velocity and the viscosity.

Accordingly, whatever be the shape of the two orifices the pressure reaction in each orifice may be expressed by each of the following equations respectively:

$$(1) \quad P_1 = pv^2 + qv\theta$$

and $$(2) \quad P_2 = rv^2 + sv\theta$$

in which $P_1$ and $P_2$ represent the pressure drops in each of the two orifices, $v$ is the velocity, $\theta$ is the viscosity; and $p$, $q$, $r$, and $s$, are constants which depend upon the size and shape of the orifices and which may be calculated or determined experimentally for the given orifices.

Equations (1) and (2) are derived as follows:

According to Newton's and Torricelli's laws, the dynamic pressure of acceleration for a liquid flowing through an orifice varies as the square of the velocity of liquid flowing.

Now, in addition to the dynamic acceleration pressure, there is a viscous friction, which is proportional to the speed of flow or velocity of the liquid, and is independent of the shape of the orifice. This is in accordance with the law of Poiseuille, and therefore the viscous component of the pressure drop will be $qv\theta$, as above.

The total pressure drop is equal to the dynamic acceleration component plus the viscous friction component or $pv^2 + qv\theta$ as in Equation (1). Equation (2) is similarly derived.

Combining Equations (1) and (2) above we have:

$$v^2(ps - qr) = P_1 s - P_2 q$$

$$(3) \quad v^2 = \frac{P_1 s - P_2 q}{ps - qr}$$

and also from Equations (1) and (2):

$$v\theta(ps - qr) = P_2 p - P_1 r$$

$$(4) \quad v\theta = \frac{P_2 p - P_1 r}{ps - qr}.$$

Since the values for $v^2$ and $v\theta$ are easily derivable functions of the pressure drops in two arbitrarily chosen orifices, it will be seen, that the generality of the case is not detracted from, if conditions are simplified, by so shaping the orifices that one actually measures $v^2$ and the other $v\theta$. We will then have a pressure drop which is a function of $v^2$ only in one orifice; while in the other we will have a pressure drop which is a function of $v\theta$ only.

The design of orifices to obtain certain predetermined characteristics is well understood by those skilled in the art. For example, in order to obtain a pressure drop proportional to the square of the velocity, a sharp edged orifice 1 of the type disclosed in Fig. 1 should be employed. This will offer practically no resistance resulting from friction to the flow; substantially the entire pressure drop being a result of the acceleration in the narrow opening.

Figure 1:
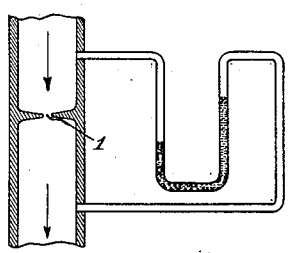
Figure 2:
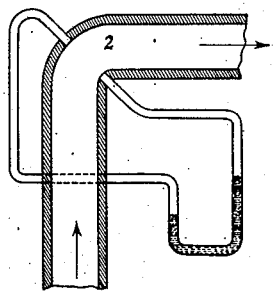

In Fig. 2 there is shown a modified form of orifice which will give the characteristics of that shown in Fig. 1. The liquid is forced to flow around a bend, and the pressure difference between the outside and inside of the bend is measured. Since the points at which the pressures are measured are at the same level of the liquid, the pressure difference is entirely dynamic, and is caused by the relative acceleration due to change of direction, and is proportional to the square of the velocity of the liquid flowing.

Figure 3:
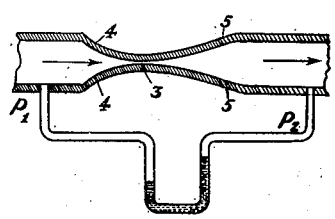

In Fig. 3 there is shown an orifice designed to give a pressure drop which is proportional to $v \cdot \theta$. This orifice is seen to comprise a restricted passage 3 having the rounded faces 4 and the gradually curved faces 5 designed to prevent turbulence in the flowing liquid. The pressure difference is measured between the points $p_1$ and $p_2$ and the loss in pressure is entirely due to viscous friction. It is understood that the diameters of the conduit before and after the orifice are equal, or so wide that the velocity $v$ and the kinetic energy $g/2 \cdot v^2$ in the conduit can be neglected.

The mechanical means for producing a movement proportional to $v^2$ and $v\theta$ respectively, is preferably a bellows chamber which is made to expand in accordance with the pressure of the liquid in the chamber. The bellows may be arranged to operate against a spring thus insuring faithful response in the movement produced by the bellows due to the liquid pressure therein.

It will thus be seen that a first movement (5) $\quad a = c_1 v^2$ and a second movement (6) $\quad b = c_2 v\theta$ may be produced.

$c_1$ and $c_2$ are constants depending upon the particular apparatus used.

Solving Equations (5) and (6) for $\theta$, we have:

(7) $\quad \theta = \dfrac{\sqrt{c_1}}{c_2} \dfrac{b}{\sqrt{a}}$

Since $c_1$ and $c_2$ are constants, it is evident that the viscosity $\theta$ is a function of $$\dfrac{b}{\sqrt{a}},$$

and any movement following a function of $$\dfrac{b}{\sqrt{a}}$$

will indicate correct values for the viscosity on a properly calibrated scale, regardless of the separate values of "$a$" and "$b$".

Figure 4:
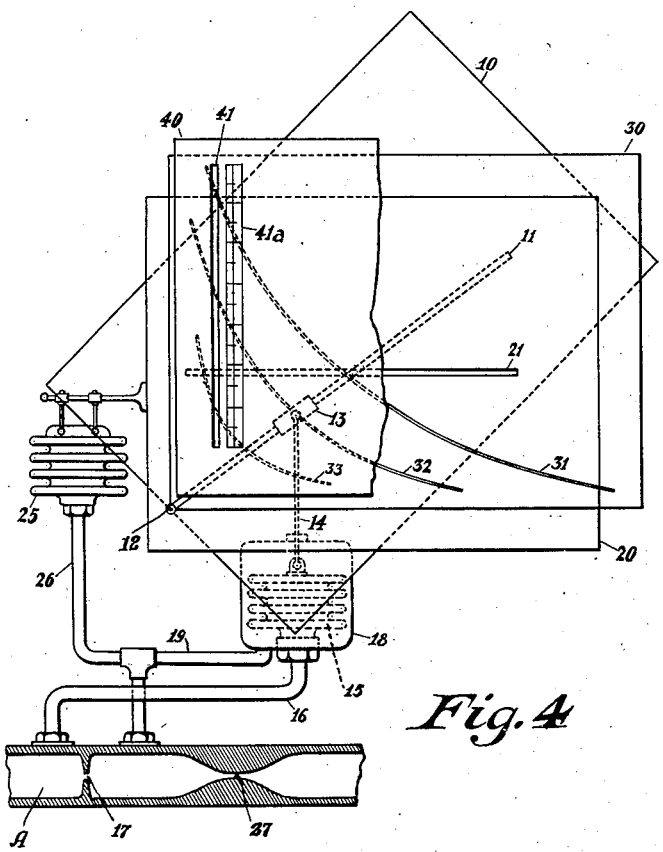
Fig. 4 shows a device embodying the present invention.
Figure 5:
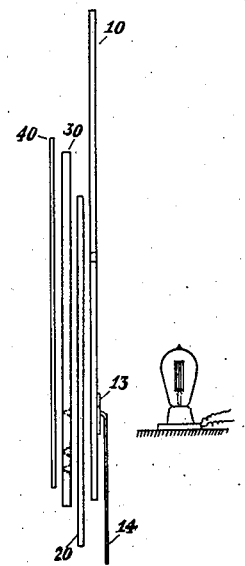
Fig. 5 is an end view of the device shown in Fig. 4.

Referring in detail to Fig. 4, we will describe one arrangement for obtaining the function $$\dfrac{b}{\sqrt{a}}.$$

An opaque sheet 10 of any durable material, provided with a slot 11 running transversely thereof, is pivoted at 12. A cross-head 13 is mounted in the slot 11 for sliding engagement therewith, and a link 14 couples the cross-head to the bellows 15. A conduit A through which the liquid to be tested flows is provided with a sharp edged orifice 17. The bellows 15 is connected in front of the orifice 17 by means of the pipe 16. The bellows 15 is encased by a chamber 18 thru which the member 14 slides. The chamber is sealed by some suitable means as a stuffing box for example to maintain a pressure in the chamber equal to the pressure after the orifice 17 and before the orifice 27. The pipe 19 serves to connect the chamber to this point between the two orifices.

A second opaque sheet 20 lying parallel to 10 is provided with a slot 21 running transversely thereof. The sheet 20 is fixedly joined to the bellows 25 for movement therewith in a vertical plane, whereby the slot 21 always moves parallel to itself without rotation, or in other words the slot 21 remains horizontal while moving vertically. A second orifice 27 is provided in the conduit A, and this bellows 25 is connected in advance of 27 by means of the pipe 26.

Mounted in front of the sheets 10 and 20 is a plane glass plate 30 having the hyperbolic curves 31, 32, and 33 formed in the glass as triangular grooves. Rearwardly of the sheets 10 and 20 is any suitable light source.

In front of the glass plate 30 is mounted an opaque sheet 40 having a vertical slot 41, the length of the slot being sufficient to expose a portion of each of the hyperbolic curves formed in the glass plate 30. These curves are drawn with respect to rectangular coordinates having the point 12 as the origin. Since the bellows 15 is connected to the conduit A by pipes 16 and 19 at both sides of the orifice which gives a pressure drop proportional to the square of the velocity, the ordinate of 13 may be represented by (8) $\quad y_1 = v^2 x$ where $x$ and $y$ are the abscissa and ordinate respectively.

Also, the plate 20 having the slot 21 is moved by the pressure in front of the orifice 27 a distance (9) $\quad y_2 = \theta v.$ Now, at the intersection of 11 and 21

$$y_1 = y_2 = v^2 x = \theta v$$

$$x v^2 = v \theta; \quad x v = \theta$$

where $y$ is the ordinate of the point of intersection and is equal to $y_1$ and $y_2$, from (9)

$$v = \dfrac{y}{\theta} \therefore \dfrac{xy}{\theta} = \theta$$

(10) $\quad xy = \theta^2$

The equation $xy = \theta^2$ is that of a hyperbola. The plane enclosed by the abscissa and ordinate may be covered by a group of curves characterized by the equation $xy = $ constant, and this is the group of hyperbolae having the abscissa and ordinate as asymptotes. The curve which passes thru the intersection of 11 and 21 is that characterized by the equation $xy = \theta^2$. This equation intersects the line $x = 1$ at the ordinate $$y = \theta^2 = \dfrac{b^2}{a}$$

see Equation (7). Accordingly, if each curve represented by $xy = \theta^2$ represents a certain viscosity the intersection of 11 and 21 will select some such curve. The various curves on the scale are calibrated to represent the values of viscosity, one curve for each value thereof.

A source of light is placed rearwardly of the sheets 10 and 20 and a small beam of light passes thru the intersection point of slots 11 and 21. This beam falls on the nearest groove in glass plate 30 and by refraction and reflection the entire groove is illuminated. The lighted groove may be seen thru the slot 41. The calibrated viscosity scale 41a is mounted on a vertical edge of the slot 41 and the reading is indicated by the illuminated portion of the groove in plate 30. Of course, the beam of light may fall intermediate of two adjacent curves. This indicates a value of viscosity intermediate of the two values of these two curves.

It will thus be seen that pressure changes created in the two separate orifices may be converted into a mechanical movement which indicates directly the viscosity on a calibrated scale.

Figure 6:
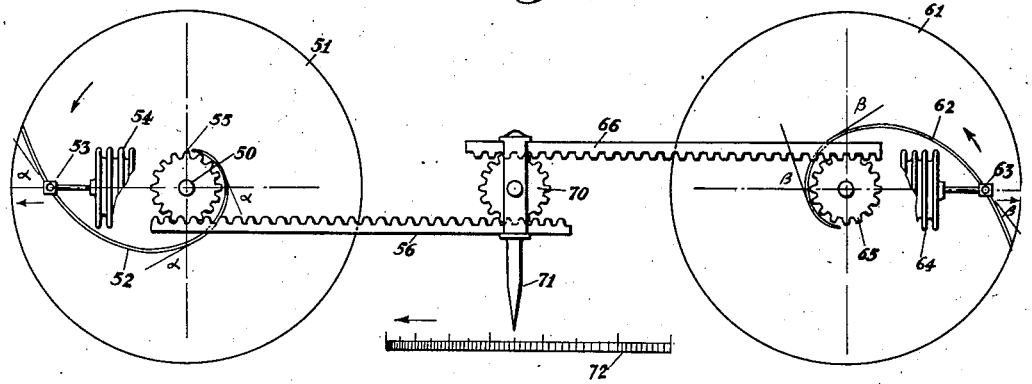
Fig. 6 shows a modification.
Figure 7:
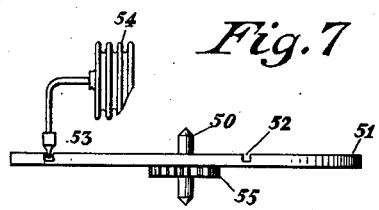
Figs. 7 and 8 are detail views of the device shown in Fig. 6.
Figure 8:
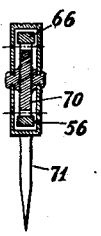

In Fig. 6 there is shown a modified form of the invention. Under certain conditions it is desirable to provide a mechanical appliance which will record the readings on a time strip, for example. This result is accomplished in the following manner:

We know that the function $$\log b/\sqrt{a} = \log b - 1/2 \log a.$$

Therefore, if we can produce mechanical movements proportional to the logarithms of these pressures created at the orifices, it is then merely necessary to subtract them instead of dividing as above.

The disc 51 is rotatable upon the shaft 50 and the disc is provided with a logarithmic spiral groove 52. The point 53 attached to the bellows 54 rides in the groove 52 and as the bellows 54 expands and contracts due to pressure changes, the point 53 moves in the groove 52 and causes the disc 51 to rotate.

A pinion gear 55 is joined to the disc 51 and rotates therewith. Rack 56 meshes with gear 55 and rotation of the gear causes lateral movement of the rack.

A second disc 61, provided with a logarithmic spiral groove 62, is actuated by the bellows 64 and point 63. The pinion gear 65 rotates with the disc and moves the rack 66 in a direction opposite to that in which the rack 56 moves. The disc 61 and its associated parts have the same operation as the disc 51 and its associated parts, with the exception that disc 51 is actuated by the bellows 54 which responds to the pressure before the sharp edged orifice, while disc 61 is actuated by the bellows 64, which bellows responds to the pressure changes created by the rounded edged orifice.

The differential gear 70 carries the pointer 71 which plays over a logarithmic scale 72 calibrated in viscosity units. The pointer remains in a vertical position as the gear rotates.

The operation of this arrangement is as follows:

The spiral groove 52 is pushed outwardly in a radial direction by a bellows moving proportional to $a = v^2$. The spiral groove 62 is similarly moved $b = v\theta$. The discs 51 and 61 and the attached pinions 55 and 65 will turn to the amount $$\phi_a = \tan P \log v^2$$

and $$\phi_b = \tan Q \log v\theta,$$

respectively; $\phi_a$ and $\phi_b$ being the angles of rotation of the discs 51 and 61, respectively and P and Q are constant factors, which depend on the size of the orifice, on the diameter and stiffness of the bellows 54 and 62 respectively, and on the constant angles alpha and beta which the logarithmic grooves form with the radii.

The racks 56 and 66 will move corresponding amounts in opposite directions.

Each of these movements will influence the differential gear 70 to the extent that its shaft and pointer loosely attached thereto will move a distance proportionate to $$1/2(r_b \tan Q \log v\theta - r_a \tan P \log v^2)$$

where $r_b$ and $r_a$ are the radii of the pinion gears 65 and 55 respectively and the angles are expressed in radians.

The radii of the gears 55 and 65 and also the tangents of the spirals (tan P and tan Q) are chosen so that $$r_b \tan Q = 2 r_a \tan P.$$

The movement of the pointer 71 is:

$$K (\log v\theta - 1/2 \log v^2)$$
$$= K (\log v\theta - \log v) = K \log \frac{v\theta}{v}$$
$$= K \log \theta \text{ when } K = \text{constant}.$$

It will thus be seen that the movement of the pointer is a logarithmic function of the viscosity alone, and since the scale 72 is provided with logarithmic graduations calibrated in terms of viscosity, the instrument indicates viscosity directly.

In accordance with another modification of this invention the viscosity readings are obtained electrically.

Figure 9:
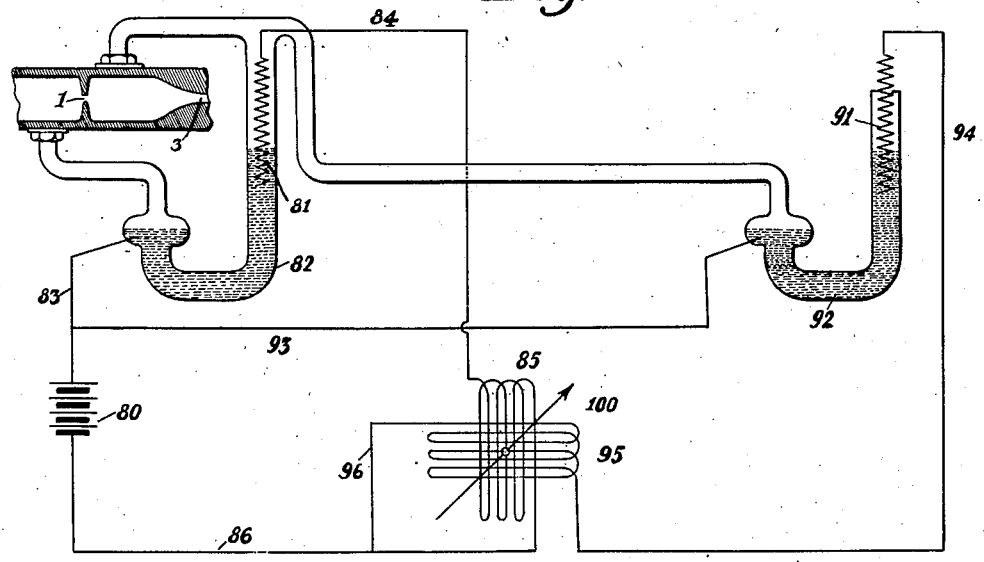
Fig. 9 shows another modification.

Referring in detail to Fig. 9 a source of E. M. F. 80, such as for example the battery of an automobile, has connected across its terminals a first and a second circuit. The first circuit consists of a resistance 81 dipping into a column of mercury 82. The mercury is contained in a U shaped receptacle as shown. A lead 83 connects one end of the mercury column to one terminal of the battery 80. A lead 84 connects the outer end of the resistance 81 to a coil 85, and the return lead 86 closes the circuit to the battery.

In the same way the second circuit includes the battery 80, the lead 93, the column of mercury 92, the resistance 91, the lead 94, the coil 95 and the return lead 96.

The coils 85 and 95 are disposed at right angles with respect to each other, and they consequently create magnetic fields at right angles to each other, when traversed by an electric current. A magnetic needle 100 is pivoted at the intersection of the two coils.

The U tubes containing the mercury are connected to the orifices 1 and 3 as shown, in order that pressure reactions may vary the height of mercury column in contact with the resistances 81 and 91. Thus the resistances are varied as functions of pressure changes occurring in the orifices.

The operation of this modification is as follows:

We have already shown that we may produce pressure reactions proportional to $v^2$ alone and $v\theta$ alone respectively.

The resistance 81 is so proportioned, as will hereinafter be described, that the total resistance of its circuit $$R_a = 1/\sqrt{a}.$$

Similarly, the resistance of the circuit 91

$$R_b = 1/b,$$

where $a$ and $b$ are the same as in Equations 5 and 6. The battery 80 will therefore produce a current $$i_a = E \cdot \sqrt{a}$$

and $i_b = Eb$ respectively in each of the circuits, E representing the battery voltage. The two currents $i_a$ and $i_b$ flow through their respective coils 85 and 95, producing two magnetic fields at right angles to each other, the angle $\phi$ assumed by the magnetic needle $$100 = \tan^{-1} b/\sqrt{a}.$$

It will thus be seen that the angle $\phi$ is independent of the absolute values of "b" and "a", and is only a function of $$b/\sqrt{a},$$

which according to Equation (7) indicates the viscosity $\theta$. The pointer is arranged to play over a scale calibrated in viscosity units.

A resistance strip to produce the resistance proportional to $$1/\sqrt{a}$$

is prepared as follows:

Neglecting the resistance of the mercury column and outside connections, when there is no pressure on the column 82, length of the strip$=L_o$. A pressure due to the flow of liquid acting on the mercury column reduces this length according to the equation $$L = L_o - C_1 a$$

and the resistance $$r = r_a \cdot \frac{1}{\sqrt{a}}$$

Under these conditions the strip 81 must be so wound that $$r = \frac{r_a C_1}{\sqrt{L_o - L}}$$

and the following differential equation expresses the ratio of increases of the resistance to lengths.

$$\frac{dr}{dL} = \frac{r_a C_1}{2}(L_o - L)^{-3/2}$$

The resistor 91 is designed as follows:

For $b = o$ the free length of 91 will be $l_o$.

At pressure $b$, resulting from the effect of the flow of liquid upon the column 92, the free length of 91 will be $$1 = l_o - C_2 b$$

and the resistance will be $$r = \frac{r_b - C}{1_o - 1}$$

and $$\frac{dr}{d1} = \frac{r_b \cdot C}{(1_o - 1)^2}$$

expresses the rate of change of resistance with respect to the length.

Having thus described the invention, we claim:

1. A viscosity meter comprising in combination, a conduit having a first orifice and a second orifice, whereby a liquid flowing through said conduit passes successively through each of said orifices, one of said orifices having a negligible length so that the loss of pressure therethrough due to frictional loss is relatively small and the other of said orifices having a relatively greater length so that the pressure drop of liquid flowing therethrough is caused mainly by frictional losses, separate means connected to said conduit at each of said orifices to produce a mechanical movement corresponding to the pressure reaction of liquid flowing therethrough, and means to produce an indication which is a resultant of said two movements.

2. A viscosity meter comprising in combination, a conduit in which the liquid to be tested is adapted to flow, and having a sharp edge orifice connected in said conduit, means responsive to pressures which are proportional to the square of the velocity of the liquid flowing through said sharp edged orifice, said conduit also having a rounded edged orifice therein, each of said orifices offering a different resistance to the flow of liquid therethrough, means responsive to pressures which are proportional to the product of the velocity and viscosity of the liquid flowing, and means actuated by both said last mentioned means to indicate the viscosity.

3. A viscosity meter comprising in combination, a conduit in which the liquid to be tested is adapted to flow, said conduit having a first orifice and a second orifice, said orifices being designed to produce pressure changes proportional to the square of the velocity and the product of velocity times the viscosity, respectively, of the liquid flowing, means responsive to the square of the velocity to produce a first mechanical movement, means responsive to the product of velocity times the viscosity to produce a second mechanical movement, and means to combine said movements, whereby to indicate the viscosity of the liquid flowing.

4. A viscosity meter comprising in combination a conduit in which the liquid to be tested is adapted to flow, said conduit having a first orifice and a second orifice, means connected to said conduit at said first orifice to produce a first mechanical movement in accordance with pressure changes in said orifice, means connected to said conduit at said second orifice to produce a second mechanical movement in accordance with pressure changes in said orifice, means to combine said movements, and means to indicate said combination.

5. A viscosity meter comprising in combination a conduit in which the liquid to be tested is adapted to flow, said conduit having a first orifice and a second orifice, means connected to said conduit at said first orifice to produce a first mechanical movement in accordance with pressure changes due to said orifice, means connected to said conduit at said second orifice to produce a second mechanical movement in accordance with pressure changes due to said orifice, a first member having a slot and being movable by said first mentioned means, a second member having a slot and being movable by said last mentioned means, said slots being arranged to intersect for certain values of viscosity, a member having a scale calibrated in viscosity units, and means cooperating with said scale member and the intersection of said slots for indicating the value of the viscosity of the liquid flowing.

WALTER ALBERSHEIM.
HARVEY S. KONHEIM.